United States Patent [19]

Williams et al.

[11] Patent Number: 5,061,303

[45] Date of Patent: Oct. 29, 1991

[54] SNAP-IN FILTER UNIT

[75] Inventors: Roger D. Williams, Dallas; Stephen M. Sanders, Mt. Ulla, both of N.C.

[73] Assignee: Pneumafil Corporation, Charlotte, N.C.

[21] Appl. No.: 387,711

[22] Filed: Jul. 31, 1989

[51] Int. Cl.⁵ .............................................. B01D 46/00
[52] U.S. Cl. ..................................... 55/341.1; 55/379
[58] Field of Search ........................ 55/302, 341.1, 379

[56] References Cited

U.S. PATENT DOCUMENTS

| | | | |
|---|---|---|---|
| 4,198,216 | 4/1980 | Wilhelmsson | 55/341.1 |
| 4,220,459 | 9/1980 | Hammond et al. | 55/379 |
| 4,266,954 | 5/1981 | Oare et al. | 55/302 |
| 4,272,263 | 6/1981 | Hancock | 55/379 |
| 4,292,057 | 9/1981 | Ulvestad et al. | 55/379 |
| 4,306,893 | 12/1981 | Fernando et al. | 55/379 |
| 4,345,924 | 8/1982 | Margraf | 55/379 |
| 4,415,343 | 11/1983 | Margraf | 55/379 |
| 4,504,288 | 3/1985 | Kreft | 55/379 |

FOREIGN PATENT DOCUMENTS

| | | | |
|---|---|---|---|
| 3242704 | 5/1984 | Fed. Rep. of Germany | 55/379 |
| 53617 | 6/1946 | France | 55/379 |
| 2047114 | 11/1980 | United Kingdom | 55/379 |

Primary Examiner—Jay H. Woo
Assistant Examiner—C. Scott Bushey
Attorney, Agent, or Firm—Shefte, Pinckney & Sawyer

[57] ABSTRACT

A filter unit for insertion in, and removal from, an opening in a mounting plate of a dust collector, the filter unit including a filter bag having a lengthwise extent and a tubular configuration, and the upper portion of the bag is biased outwardly to its fully extended or cylindrical disposition and is formed with a slot for engaging the partition plate in the dust collector for mounting therein. Also, the filter unit includes a cage having a lengthwise extent and a generally tubular configuration, and the cage includes a plurality of longitudinally extending support members that engage the surrounding bag and normally maintain it at its fully extended configuration, and the support members are constructed so that they can be moved inwardly by the application of a manual force at the exterior of the upper portion of the bag, whereby the upper portion of the bag can be collapsed to permit removal and installation of the filter unit in the partition plate.

9 Claims, 3 Drawing Sheets

SNAP-IN FILTER UNIT

BACKGROUND OF THE INVENTION

The present invention relates generally to filtering apparatus, such as dust collectors or the like, and, in particular, to a filter unit utilized in apparatus of this type.

One well-known type of industrial filtering apparatus is a dust collector that utilizes, as the filtering medium, a large number of fabric bags that have a tubular configuration and a substantial lengthwise extent. The dust collector includes a partition plate that separates the clean air compartment from the dirty air compartment of the dust collector, and this partition plate is formed with a large number of openings arranged in a pattern, and a fabric filter bag is mounted to the partition plate at each such opening, whereby the filter bags depend vertically from the partition plate into the dirty air compartment and the interior of the bags are in open communication with the openings in the partition plate. When a pressure drop is imposed across the partition plate and the filter bags by a blower or the like, the air with entrained dust or the like is caused to flow from the dirty air chamber through the fabric of the filter bag to the interior thereof, thereby depositing dust on the exterior surfaces of the filter bags and causing the cleaned air to flow from the interior of the bags and through the openings in the partition plate into the clean air compartment. In virtually all dust collectors of this type which are in use today, some apparatus is provided for cleaning the bags at periodic intervals, such as by utilizing a reverse flow of air or a pulse jet of air to separate collected dust from the exterior surfaces of the bags so that it can be collected in a hopper and removed from the apparatus. Typical examples of dust collectors of the foregoing type are disclosed in U.S. Pat. Nos. 3,648,442, 3,951,627 and 4,157,899.

Because the fabric material from which the filter bags are formed is generally flaccid, the air flow through the bags and the pressure drop thereacross will tend to collapse the bags and thereby reduce the exposed surface area of the bags that is available for filtering the air. Accordingly, it is common practice to provide each filter bag with a cylindrical wire cage that is rigid and that extends lengthwise within the interior of the bag to provide a rigid support that prevents the bag from collapsing inwardly, and the bag is therefore maintained in its generally tubular or cylindrical configuration.

While these wire cages significantly increase the efficiency of the dust collectors by maintaining the bags at their fully expanded dispositions, they present problems in terms of removing a bag from its mounting in the partition plate when it becomes necessary to replace an exhausted bag with a new bag, and similar problems are encountered when the new bag is installed in the opening of the partition plate.

Space requirements and/or application variables sometimes allow a dust collector to be designed so that personnel who replace the old filter bag unit with new ones must enter the dust collector only in the clean air compartment above the partition plates in which case the old filter bag units are removed upwardly through the openings in the partition plate and the new filter units are inserted downwardly through such openings. In one known arrangement, the filter bag is dropped through an opening, but one end portion of the bag is maintained at the top surface of the partition plate until a rigid wire cage is inserted downwardly into the bag, the rigid wire cage being formed with an enlarged end portion having a diameter greater than the diameter of the opening in the partition plate so that this enlarged portion can engage the end portion of the bag and hold it in place against the upper surfaces of the partition plate. In many instances, a clamp or other retaining member is then screwed into the partition plate and arranged to engage the enlarged portion of the rigid wire cage and hold it in place. In an improved version of this arrangement, the end portion of the fabric bag is provided with an embedded snap band spring that urges the bag into engagement with the opening in the partition plate. The rigid wire cage has an enlarged portion having a cup-like inverted U-shape to engage the end portion of the bag above the partition plate, and it is also provided with a resilient indent located just beneath the partition plate that bulges outwardly to cooperate with the rigid enlarged cap portion of the wire cage in holding the bag in place without requiring the screw and retaining member of the earlier version described above.

In other applications of industrial dust collectors, because of overhead space restrictions (i.e., existing buildings with low ceiling heights), the exhausted bags must be removed by workmen located in the air chamber beneath the partition, and in such dust collectors it will be apparent that the filter units described above cannot be used because the rigid enlarged portion of the wire cage is too large to permit it to be inserted upwardly through the openings in the partition plate. Thus, in these types of dust collectors, a special filter unit is provided which includes a conventional filter bag and a wire cage that is slightly shorter in length than the bag, and the wire cage is provided at its upper end with an annular metal band formed with a slit so that the diameter of the band can be changed. The metal band is also provided with an annular groove extending around its circumference. To install a new filter unit it is necessary, first, to insert the cage into the filter bag, and then fold the excess length of the filter bag into the cage about the upper edge of the annular metal band. The filter unit is then pushed upwardly onto and about a short depending circular wall located beneath each opening in the partition plate. This circular wall is provided with a projection, or reverse groove, that interfaces with the groove in the metal band of the cage to locate the filter unit in place on the circular wall, and a conventional hose clamp is then fitted around the filter bag and the metal band of the wire cage and tightened up using an appropriate tool. Thus, the end of the filter bag is held between the circular wall of the partition plate, which in some instances consists of the lower end of a venturi located in the openings of the partition plate for use with pulse jet cleaning apparatus, and the metal band of the wire cage. However, it will be apparent that the removal of an exhausted bag and the installation of a new replacement bag will require considerable time and effort because of the various steps that are required, some of which necessitate the use of special tools.

The present invention provides a unique filter unit which has universal application in that it can be used, without structural modification, for either a top-loading or a bottomloading dust collector, and, additionally, it provides a number of advantages compared to the conventional filter units described above.

SUMMARY OF THE INVENTION

In accordance with the present invention, a filter unit for insertion in, and removal from, an opening in the partition plate or mounting plate of a dust collector is provided, and this filter unit comprises a filter bag having a lengthwise extent and a generally tubular configuration, and one end portion of the filter bag is formed with a biasing element for urging the end portion of the bag to its fully expanded disposition. This upper portion of the filter bag also includes an arrangement for engaging the mounting plate when the end portion of the bag is in its expanded disposition. The filter unit also includes a cage having a lengthwise extent and a generally tubular configuration that permits it to be selectively insertable in the filter bag, and the cage has an end portion formed with a plurality of longitudinally extending support elements for engaging the upper end of the bag to normally maintain the bag at its expanded tubular configuration during use, and these support elements are selectively collapsible in an inward direction to permit the upper end of the filter bag to be moved inwardly against the urging of its biasing member during removal or insertion of the filter unit in the mounting plate.

In the preferred embodiment of the filter unit of the present invention, the support elements of the wire case includes a plurality of resilient rods, each such rod being formed with a generally U-shaped end portion for engaging and containing the end portion of the filter bag when it is mounted in place on the mounting plate. These rods are secured to a retaining ring spaced from the U-shaped end portion of the rods, and this retaining ring normally maintains the rods in a predetermined fixed annular pattern, while permitting the end portions of the rods to collapse inwardly. Also, the support means for the cage may, for some applications, include a spring that engages the rods and urges them outwardly to assist in holding the filter unit in place after it has been installed in the mounting plate.

Additionally, in the preferred embodiment of the present invention, the upper end portion of the filter bag is provided with a collar portion that has an embedded resilient band for providing the outward bias to the end of the bag, and the collar portion of the bag is formed with a slot that selectively receives and engages the mounting plate around the edge of an opening therein.

The present invention also includes a method of inserting a filter unit in the opening of a mounting plate of a dust collector or the like, this method including the steps of first providing a filter bag having a tubular configuration and a longitudinal extent, with one end portion of the filter unit being biased outwardly and including means for selectively engaging the mounting plate at the openings therein, then positioning the filter unit just beneath the openings in the mounting plate, squeezing the upper end portion of the filter unit against the aforesaid outward bias thereof until the upper end portion is collapsed sufficiently to occupy less area than that of the mounting plate opening, raising the collapsed filter unit into the mounting plate opening, and, finally, releasing the upper end portion of the filter unit so that it will be biased outwardly and cause the engaging means to engage the mounting plate, whereby the filter unit is held in place in the mounting plate.

DESCRIPTION OF THE PREFERRED EMBODIMENT

Figure 1:
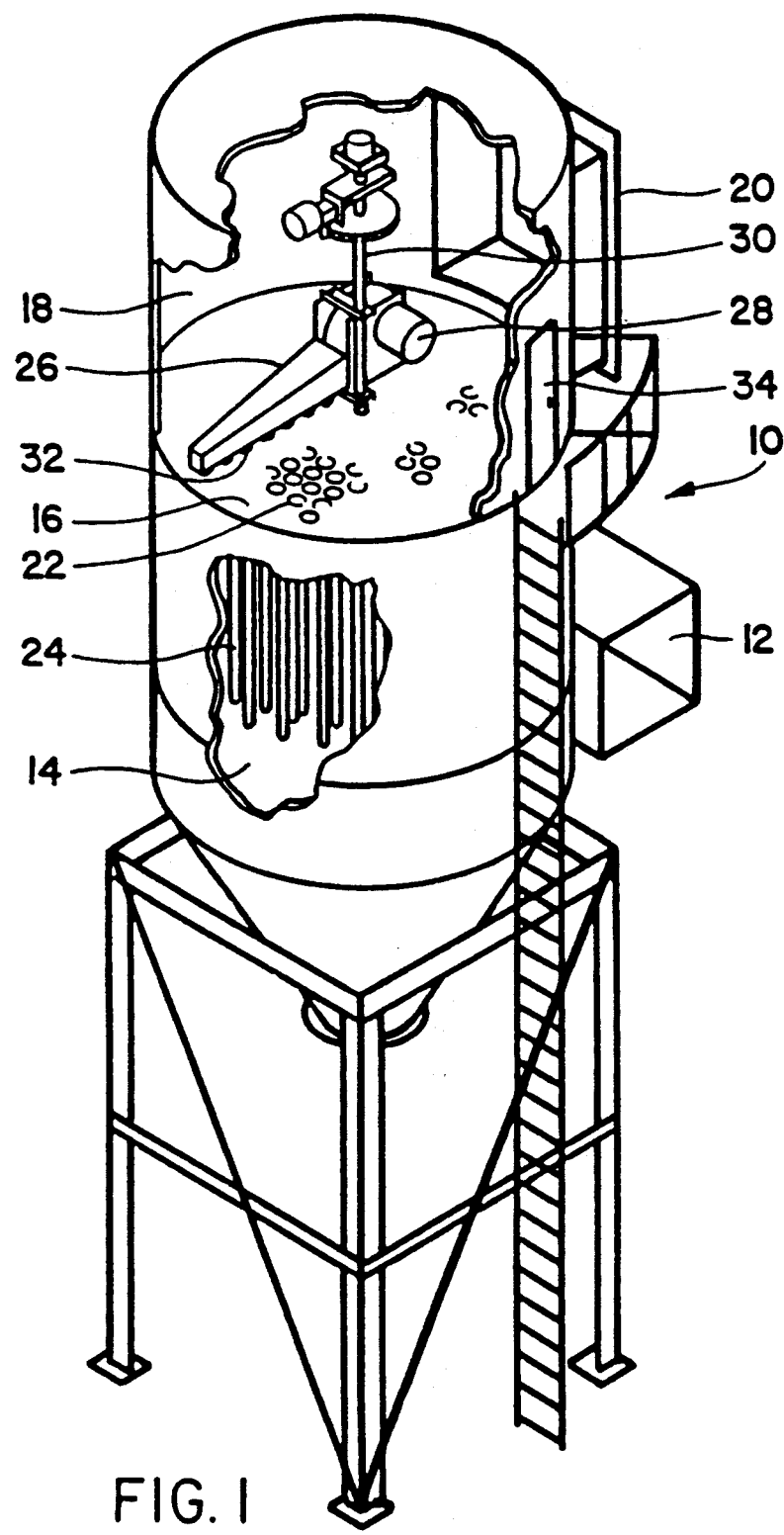
FIG. 1 is a diagrammatic illustration of a typical dust collector of the type that uses filter units according to the present invention.

Looking now in greater detail at the accompanying drawings, FIG. 1 illustrates diagrammatically a typical dust collector of the type disclosed in greater detail in the prior art patents identified above, and reference may be made to those patents for a more detailed discussion of this type of equipment. For purposes of the present invention, it is sufficient to understand that the dust collector 10 includes an inlet 12 through which air having entrained dust particles or the like is introduced into a lower dirty air chamber 14 located beneath a partition plate 16 that divides the dirty air chamber 14 and the clean air chamber 18 located above the partition plate 16 and having an outlet 20. The partition plate 16 includes a large plurality of openings 22 arranged in a predetermined pattern, and a filter bag unit is mounted in the partition plate at each opening 22, the filter bag units 24 themselves depending from the partition plate 16 and into the dirty air chamber 14. To periodically clean the bags with a reverse air flow, a plenum 26 is attached to a reverse air blower 28, and the entire unit rotates around a vertical shaft 30 so that the nozzles 32 in the bottom portion of the plenum 26 will cause the air flow generated by the blower 28 to flow downwardly through the openings 22 into the interior of the filter bag units 24, whereby such cleaning air will then pass outwardly through the filter bag units 24 and remove dust and other particles deposited thereon as described above.

It will be noted that the upper portion of the dust collector 10 includes an access door 34 through which personnel can be admitted to work on equipment inside, and also to replace worn or exhausted filter units 24 from above the partition plate 16 as described above. In other dust collectors, the access door would be in the lower compartment or dirty air chamber 14.

Figure 2:
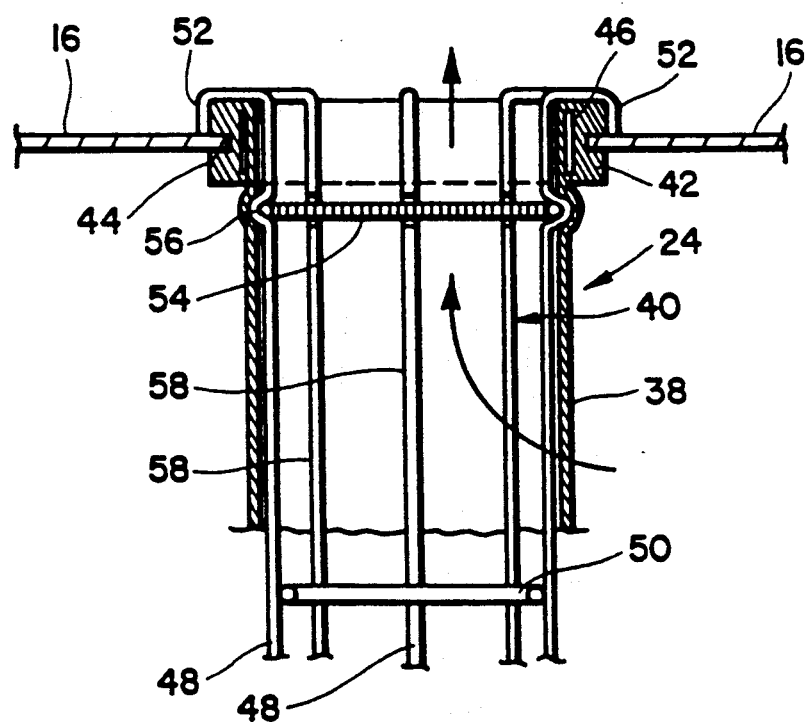
FIG. 2 is a side elevational view taken along line 2—2 in FIG. 3, and showing the filter unit of the present invention, partly in section.
Figure 3:
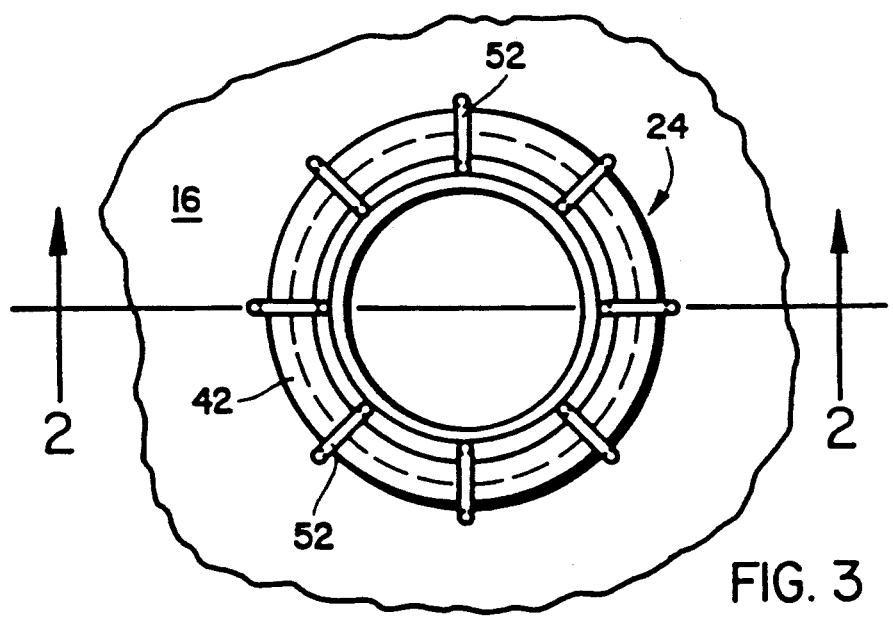
FIG. 3 is a top plan view of the filter unit shown in FIG. 2, illustrating the filter unit at its installed position.

The unique filter units of the present invention are best shown in FIGS. 2 and 3, and each filter unit 24 includes a filter bag 38 and a cage 40. The filter bag 38 is tubular, preferably cylindrical, and it has an extending length in a vertical direction that will vary with the size of the dust collector 10, including bags having a length of anywhere from four feet up to twenty feet in overall length. As best seen in FIG. 2, the filter bag 38 is formed with an enlarged collar portion 42 at the upper end of the filter bag 38, and this collar has a significantly increased thickness as compared to the thickness of the remainder of the filter bag 38. The collar portion 42 is formed with an annular slot 44 extending around the circumference thereof, and this slot receives the edges of the opening 22 in the partition plate 16. A snap band spring 46 is embedded in the collar portion 42, and it has a circumferential extent within the collar so as to normally bias the collar portion into its fully extended cylindrical or tubular configuration, and this bias tends to urge the slot 44 into positive engagement with the partition plate 16 to assist in mounting the filter bag 38 therein.

Figure 4:
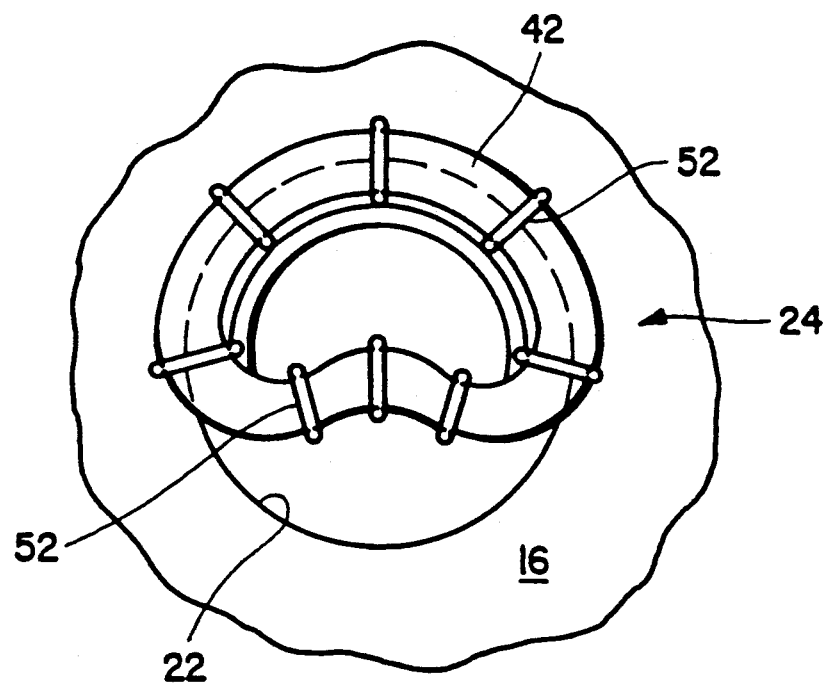
FIG. 4 is a top plan view similar to FIG. 3, but illustrating the filter unit in its partially collapsed disposition during installation or removal of the filter unit from the mounting plate.

Since the filter bags 38 are normally formed of conventional filter media fabrics that are flaccid in nature, these bags generally must be used in conjunction with some type of cage or other support member that will maintain the bag in its fully extended or tubular configuration, and that will prevent collapse of the bag as a result of the pressure drop and fluid flow across the thickness of the bag. In accordance with the present invention, the cage 40 includes a plurality of rods 48, each being preferably formed of metal so as to have some inherent resiliency, and each rod 48 being welded or otherwise firmly secured to a retaining ring 50 that is located well beneath, and spaced from, the upper end of the rods 48 as shown in FIG. 2. It will be understood that there will be a number of other retaining rings located beneath the retaining ring 50 shown in FIG. 2, the number of such retaining rings depending on the length of the cage and the desired rigidity of the cage along its extended length. The rods 48 are preferably equally spaced from one another about the circumference of the retaining ring 50 and are maintained at this spacing by their securement with the retaining ring 50, and each of the rods 48 extends upwardly from the retaining ring to terminate in an end portion having an inverted U-shaped configuration, whereby the collar 42 is received within, and retained by, the U-shaped end portions 52 of the rods 48 as best seen in FIGS. 2-4.

It will be noted that the entire upper portion 58 of the rods 48, namely the portion above the retaining ring 50, is not connected to any rigid member, and each upper rod portion 58, by virtue of its own inherent resiliency, can be squeezed or moved radially inwardly about its connection with the retaining ring 50 when a manual squeezing force is applied thereto, as will be explained in greater detail below. In many applications of the present invention, the stiffness of the upper rod portions 58 will be sufficient to maintain the adjacent portion of the surrounding bag 58 in its fully expanded or tubular configuration, notwithstanding the fluid flow inwardly through the bag 38 and the pressure drop across the bag 38. However, in some applications where the pressure drop across the bag 38 is high, it is preferable to utilize a circular garter spring 54 disposed in a detent 56 located in each upper rod portion 58, the detents 56 being located just below the collar portion 42 of the bag 38. Thus, the garter spring 54, when necessary, will cooperate with the inherent stiffness of the upper rod portions 58 to maintain the upper portion of the bag 38 in its fully extended disposition even when there is a high pressure drop across the bag 38, but the garter spring will permit the upper rod portions 58 to move inwardly against the combined bias of the inherent stiffness of the upper rod portions 58 and the bias exerted by the garter spring 54 when a predetermined squeezing force is exerted on the filter unit 24 as described below.

The filter unit 24 is illustrated in FIGS. 2 and 3 in its normal operating position, and it will be noted that the filter bag 38 is maintained securely in place by the slot 44 cooperating with the snap band spring 46 in the bag collar 42 as described above. Additionally, it will be noted that the extending ends of the inverted U-shaped end portion 52 of each rod 48 is in contact with the upper surface of the partition plate 16 to thereby assist in holding the bag 38 in place. Also, since the rods 48 will normally be formed of metal, the contact between the metal rods 48 and the metal of the partition plate 16 will result in the removal of static electricity that tends to build up as a result of the friction and abrasion occurring during the filtering process, this static electricity passing from the rods of the filter unit 24 to the partition plate 16.

Whenever it is necessary to remove a filter unit 24 from its opening 22 in the partition plate 16, such as when the bag 38 has become worn or torn, the filter unit can be readily removed from either above or below the partition plate 16. If the workman who is to remove the filter unit 24 is in the compartment below the partition plate 16, the workman simply grasps the upper portion of the filter unit which is just below the partition plate 16 and exerts a squeezing force on the upper portion of the filter unit that overcomes the bias of the snap band spring 46 and, if necessary, the bias of the garter spring 54, until a portion of the filter bag unit 24 is distorted in a radially inward direction as shown in FIG. 4. Since the collar portion 42 is collapsed to occupy an area that is substantially less than the area of the opening 22, the filter unit 16 can be easily manipulated to slide the slot 44 away from its engagement with the partition plate 16, and the entire unit can then be withdrawn downwardly through the opening 22 for removal. To install a new filter bag unit 24 in the opening 22, the reverse procedure is carried out. More specifically, after the cage 40 has been properly inserted in a new bag 38, the filter unit 24 is disposed just beneath the opening 22 in the partition plate 16, and it is squeezed or collapsed inwardly as shown in FIG. 4 by a manual exertion of force until a portion of the collapsed collar portion 42 can be manipulated into the opening 22 with the slot 44 engaging the partition plate 16 (see the upper portion of the filter unit in FIG. 4), after which the manual force being exerted on the upper portion of the filter unit is released in a manner that permits the collar portion to assume its normal fully extended cylindrical disposition, and with the slot 44 receiving the partition plate 16 around the entire periphery of the collar 42.

It will be noted that the removal and installation procedures set forth above can be carried out quickly and easily, and no tool of any kind is required. As a result, it is believed that installation time for filter units of the present invention in bottom-loading dust collectors will be reduced by as much as 75% as compared with the conventional filter units described above, and this offers significant advantages both in terms of labor savings and in terms of safety and environmental considerations. In the latter regard, it should be noted that workmen who are required to install new filter units from beneath the partition plate are constantly exposed to dust particles and other foreign matter that is inherently present in the dirty air compartment, and any reduction in the time it takes to complete the installation process results in less exposure of the workmen to these harmful conditions. Additionally, it is believed that the filter unit of the present invention provides a more secure seal between the filter unit and the partition plate, which is an important factor in dust collectors since any failure of this seal will result in dust particles or foreign matter passing through the seal from the dirty air compartment to the clean air compartment without being filtered by the filter media in the bag. The filter unit of the present invention is also more reliable than the bottom-loading filter units described above that requires a hose clamp because these hose clamps are continuously exposed to moisture during use, and they tend to corrode as a result of such exposure, in which case they may reduce the effectiveness of the seal or require replacement. Finally, it is very important to note that the filter unit of the present invention has universal application in either top-loading or bottom-loading dust collectors. The removal and installation procedures for bottom-loading dust collectors is described above, and it will be apparent from FIG. 2 that the filter unit 24 can be quickly mounted in the partition plate 16 from a location above the partition plate 16 by simply dropping the portion of the bag beneath the collar 42 through the opening 22 until the collar portion 42 reaches the opening 22, whereupon the collar portion 42 can be easily squeezed and manipulated to snap the slot 44 in place so as to engage the partition plate. Then, the cage 40 is inserted downwardly through the interior of the bag 38 until the ends of the inverted U-shaped portions 52 engage the upper surface of the partition plate 16, and the filter unit 24 will then be in its operating position as shown in FIG. 2.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. For example, the filter units 24 of the present invention have been described in connection with their use in dust collectors, but it will be readily understood that such filter units may well have applications in other equipment where the features of the present invention can be effectively utilized. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

We claim:

1. A self-contained filter unit for insertion in, and removal from, an opening of a mounting plate in a dust collector, said filter unit being characterized by a structure enabling insertion and removal of the filter unit to be accomplished from either above or below said mounting plate, said filter unit comprising:

a) a filter bag having a lengthwise extent and a generally tubular configuration, said filter bag having one end portion thereof formed with biasing means for urging said end portion toward an expanded disposition and with engaging means for engagement with said mounting plate when said end portion of said bag is at said expanded disposition thereof; and b) cage means having a lengthwise extent and a generally tubular configuration so as to be selectively insertable in said filter bag, said cage means having a resilient upper end which is selectively collapsible inwardly between a normal expanded operating disposition and a collapsed installation and removal disposition, said upper end of said cage means including a first portion formed to normally extend over and engage the upper surface of said mounting plate to support said cage means thereat and normally prevent movement of said cage means downwardly through said opening in said mounting plate when said upper end is in its normal expanded operating disposition, and said upper end of said cage means further including a second portion formed with a plurality of longitudinally extending support means for engaging said one end of said bag to normally maintain it in its tubular configuration when said upper end is in its normal expanded operating disposition, said upper end of said cage means being sufficiently collapsible in an inward direction to permit said first cage portion and said one end of said filter bag to be moved inwardly to a sufficiently collapsed extent in said installation and removal disposition of said upper end of said cage means to occupy an area that is less than the area of said opening in said mounting plate to enable said filter bag and said cage means to be inserted in or removed from said opening from either above or below said mounting plate.

2. A filter unit as defined in claim 1 and further defined in that said cage support means includes a plurality of resilient rods, each said rod being formed with a generally U-shaped end portion for engaging said end portion of said filter bag.

3. A filter unit as defined in claim 2 and further defined in that said rods are secured to a retaining element means spaced from said U-shaped end portion of said rods, said retaining element means normally maintaining said rods in a predetermined fixed annular pattern while permitting said end portions of said rods to collapse inwardly.

4. A filter unit as defined in claim 3 and further defined in that said cage support means includes a spring means for engaging said rods and urging them outwardly.

5. A filter unit as defined in claim 1 and further defined in that said cage means includes a spring means for engaging said longitudinally extending support means and urging them outwardly.

6. A filter unit as defined in claim 2 and further defined in that said one end of said filter bag includes a collar portion formed with slot means for selectively receiving and engaging said mounting plate around the edge of said opening thereon.

7. A filter unit as defined in claim 6 and further defined in that said filter bag biasing means comprises a resilient band mounted in said collar portion.

8. A filter unit as defined in claim 6 and further defined in that said cage support means includes a plurality of resilient rods, each said rod being formed with a generally U-shaped end portion for engaging said collar portion of said filter bag, and for abutting said mounting plate when said filter unit is inserted therein.

9. A self-contained filter unit for insertion in, and removal from, an opening of a mounting plate in a dust collector, said filter unit being characterized by a structure enabling insertion and removal of the filter unit to be accomplished from either above or below said mounting plate, said filter unit comprising:

a) a filter bag having a lengthwise extent and a generally tubular configuration, said filter bag having one end portion thereof formed as an enlarged collar having a slot means for selectively receiving and engaging said mounting plate around the edge of said opening therein, said collar having mounted therein a resilient band for urging said one end portion to said bag toward an expanded disposition whereby said slot in said collar is urged into engagement with said mounting plate; and b) cage means having a lengthwise extent and a generally tubular configuration so as to be selectively insertable in said filter bag, said cage means having a resilient upper end which is selectively collapsible inwardly between a normal expanded operating disposition and a collapsed installation and removal disposition, said upper end of said cage means including a plurality of rods extending longitudinally and being angularly spaced from one another to provide a support at the interior surface of said filter bag to normally maintain said filter bag at its expanded tubular configuration when said upper end of said cage means is in its normal expanded operating disposition, said rods being secured to a retaining ring spaced from the extending ends of said rods to enable the portions of said rods projecting from said retaining ring and said filter bag to be sufficiently collapsible in an inward direction to permit said one end portion of said filter bag and said rods to be moved inwardly to a sufficiently collapsed extent in said installation and removal and disposition of said upper end of said cage means to occupy an area that is less than the area of said opening in said mounting plate for enabling said filter bag and said cage means to be inserted in or removed from said opening from either above or below said mounting plate, each of said rods being formed with a U-shaped end portion for receiving and retaining therein said filter bag collar portion and for abutting the upper surface of said mounting plate and supporting said filter unit thereat when said filter unit is mounted therein in said normal expanded disposition of said upper end of said cage means.

* * * * *

UNITED STATES PATENT AND TRADEMARK OFFICE
CERTIFICATE OF CORRECTION

PATENT NO. : 5,061,303

DATED : October 29, 1991

INVENTOR(S) : Roger D. Williams and Stephen M. Sanders

It is certified that error appears in the above-identified patent and that said Letters Patent is hereby corrected as shown below:

Column 2, line 66, reads "bottomloading" but should read --bottom-loading--.

Column 9, line 19, reads "angularly" but should read -- annularly --.

Column 10, line 9, delete "and".

Signed and Sealed this

Twentieth Day of April, 1993

Attest:

MICHAEL K. KIRK

*Attesting Officer*  *Acting Commissioner of Patents and Trademarks*